(12) United States Patent
Kaliteevskiy et al.

(10) Patent No.: US 10,862,678 B2
(45) Date of Patent: Dec. 8, 2020

(54) METHODS AND SYSTEMS FOR EMPTY PULSE MITIGATION IN QUANTUM KEY DISTRIBUTION SYSTEMS USING ENTANGLED PHOTONS

(71) Applicant: Corning Incorporated, Corning, NY (US)

(72) Inventors: Nikolay A Kaliteevskiy, Saint-Petersburg (RU); Michal Mlejnek, Big Flats, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 223 days.

(21) Appl. No.: 15/977,371

(22) Filed: May 11, 2018

(65) Prior Publication Data

US 2018/0331826 A1 Nov. 15, 2018

Related U.S. Application Data

(60) Provisional application No. 62/505,182, filed on May 12, 2017.

(51) Int. Cl.
*H04L 29/06* (2006.01)
*H04L 9/08* (2006.01)
*H04B 10/70* (2013.01)

(52) U.S. Cl.
CPC ........... *H04L 9/0858* (2013.01); *H04B 10/70* (2013.01)

(58) Field of Classification Search
CPC .................................................. H04L 9/0858
See application file for complete search history.

(56) References Cited

U.S. PATENT DOCUMENTS 7,242,774 B1 7/2007 Elliott et al.
7,502,476 B1 * 3/2009 Trifonov ............... H04L 9/0852
380/256

(Continued)

FOREIGN PATENT DOCUMENTS

KR 630954 B1 10/2006

OTHER PUBLICATIONS

International Search Report and Written Opinion PCT/US2018/032319 dated Sep. 21, 2018.

(Continued)

*Primary Examiner* — Dao Q Ho
(74) *Attorney, Agent, or Firm* — Russell S. Magaziner; Svetlana Z. Short

(57) ABSTRACT

A method of communicating information includes generating a photon pulse using an entangled photon generator. The photon pulse includes a photon pulse state and is temporally positioned within a photon pulse time slot. When the photon pulse is in a populated photon pulse state, it includes first and second entangled photons and the entangled photon generator outputs the first entangled photon into a first photon pathway optically coupled to an output end photon detector unit, and the second entangled photon into a second photon pathway, optically coupled to a receiving end photon detector unit. The method also includes determining the photon pulse state of the photon pulse using the output end photon detector unit, which outputs a signal regarding the photon pulse state of the photon pulse into a signal pathway to provide the receiving end photon detector unit with information regarding the photon pulse state of the photon pulse.

10 Claims, 7 Drawing Sheets

(56) References Cited

U.S. PATENT DOCUMENTS

| | | | |
|---|---|---|---|
| 7,536,012 | B1 | 5/2009 | Meyers et al. |
| 8,116,636 | B2 | 2/2012 | Youn et al. |
| 8,238,556 | B2 | 8/2012 | Yuan et al. |
| 8,600,051 | B2 | 12/2013 | Noh |
| 8,654,979 | B2 | 2/2014 | Hicks |
| 9,722,785 | B2 | 8/2017 | Kim et al. |
| 2008/0260393 | A1* | 10/2008 | Youn .................... H04L 9/0858 398/152 |
| 2009/0028332 | A1 | 1/2009 | Parker et al. |
| 2010/0002881 | A1* | 1/2010 | Youn .................... H04B 10/70 380/256 |
| 2011/0075839 | A1* | 3/2011 | Noh .................... H04L 9/0858 380/44 |
| 2011/0232997 | A1 | 9/2011 | Wang |
| 2016/0315715 | A1 | 10/2016 | Smith et al. |
| 2016/0359624 | A1* | 12/2016 | Kim .................... H04B 10/70 |
| 2017/0163415 | A1 | 6/2017 | Gray et al. |
| 2018/0331826 | A1* | 11/2018 | Kaliteevskiy .......... H04B 10/70 |

OTHER PUBLICATIONS

Eraerds et al; "Quantum Key Distribution and 1 GBPS Data Encryption Over a Single Fibre"; New J. Phys. 12, (2010); 16 Pages.
Patel et al; "Coexistence of High-Bit-Rate Quantum Key Distribution and Data on Optical Fiber"; Physical Review X, 2, (2012) p. 041010-1-041010-8.
Easyfairs; ICTEXPO; ID Quantique SA (IDQ)—Swiss Quantum Security; 2015; 18 pages; http://www.easyfairs.com/events_216/ictexpo-2015_63499/ictexpo-2015_63500/exhibitors-products_63550/exhibitor-catalogue_63553/stand/541848/.

\* cited by examiner

METHODS AND SYSTEMS FOR EMPTY PULSE MITIGATION IN QUANTUM KEY DISTRIBUTION SYSTEMS USING ENTANGLED PHOTONS

This application claims the benefit of priority of U.S. Provisional Application Ser. No. 62/505,182 filed on May 12, 2017 the contents of which are relied upon and incorporated herein by reference in their entirety as if fully set forth below.

BACKGROUND

The present disclosure relates to quantum communication systems for generating a quantum cryptography key. More specifically, the present disclosure is directed to methods and quantum communications systems for generating a quantum cryptography key at increased quantum bit rates by mitigating the adverse effects of noise signals in empty photon pulses.

BRIEF SUMMARY

According to the subject matter of the present disclosure, a method of communicating information includes generating a photon pulse using an entangled photon generator. The photon pulse includes a photon pulse state that is either a populated photon pulse state or an empty photon pulse state. The photon pulse is temporally positioned within a photon pulse time slot. Further, when the photon pulse generated by the entangled photon generator is in the populated photon pulse state, the photon pulse includes a first entangled photon entangled with a second entangled photon, the entangled photon generator outputs the first entangled photon into a first photon pathway, which optically couples the entangled photon generator and an output end photon detector unit, and the entangled photon generator outputs the second entangled photon into a second photon pathway, which optically couples the entangled photon generator and a receiving end photon detector unit. The method also includes determining the photon pulse state of the photon pulse using the output end photon detector unit and outputting, from the output end photon detector unit, a signal regarding the photon pulse state of the photon pulse into a signal pathway, which communicatively couples the output end photon detector unit and the receiving end photon detector unit, such that the signal provides the receiving end photon detector unit with information regarding the photon pulse state of the photon pulse.

In accordance with one embodiment of the present disclosure, a method of generating a quantum cryptography key includes generating a plurality of photon pulses using an entangled photon generator. The plurality of photon pulses each include a photon pulse state that is either a populated photon pulse state or an empty photon pulse state. Each photon pulse of the plurality of photon pulses is temporally positioned within a photon pulse time slot. Further, when an individual photon pulse generated by the entangled photon generator is in the populated photon pulse state, the photon pulse includes a first entangled photon entangled with a second entangled photon, the entangled photon generator outputs the first entangled photon into a first photon pathway, which optically couples the entangled photon generator and an output end photon detector unit, and the entangled photon generator outputs the second entangled photon into a second photon pathway, which optically couples the entangled photon generator and a receiving end photon detector unit. The method also includes determining the photon pulse state of each photon pulse of the plurality of photon pulses using the output end photon detector unit, outputting, from the output end photon detector unit, a plurality of signals regarding the photon pulse states of the plurality of pulses into a signal pathway communicatively coupled to the receiving end photon detector unit, such that each signal of the plurality of signals provides the receiving end photon detector unit with information regarding the photon pulse state of each of the plurality of photon pulses, generating, upon each receipt of an individual second entangled photon by the receiving end photon detector unit, measurement information regarding an entangled photon pair of the individual second entangled photon, generating a plurality of quantum key bits based on the measurement information of entangled photon pairs of photon pulses that are in the populated photon pulse state, and generating a quantum cryptography key having the plurality of quantum key bits.

In accordance with yet another embodiment of the present disclosure, a method of generating a quantum cryptography key includes generating a plurality of photon pulses using an entangled photon generator. The plurality of photon pulses each include a photon pulse state that is either a populated photon pulse state or an empty photon pulse state. Each photon pulse of the plurality of photon pulses is temporally positioned within a photon pulse time slot. The entangled photon generator includes a laser source and a non-linear crystal that is optically coupled to the laser source. Further, when an individual photon pulse generated by the entangled photon generator is in the populated photon pulse state, the photon pulse includes a first entangled photon entangled with a second entangled photon each output by the entangled photon generator using a parametric down conversion process, the entangled photon generator outputs the first entangled photon into a first photon pathway, which is an optical fiber and optically couples to the entangled photon generator and an output end photon detector unit that is a single photon detector unit, and the entangled photon generator outputs the second entangled photon into a second photon pathway, which is an optical fiber and optically couples to the entangled photon generator and a receiving end photon detector unit. The method also includes determining the photon pulse state of each photon pulse of the plurality of photon pulses using the output end photon detector unit, outputting, from the output end photon detector unit, a plurality of signals regarding the photon pulse states of the plurality of pulses into a signal pathway communicatively coupled to the receiving end photon detector unit, such that each signal of the plurality of signals provides the receiving end photon detector unit with information regarding the photon pulse state of each of the plurality of photon pulses, generating, upon each receipt of an individual second entangled photon by the receiving end photon detector unit, measurement information regarding an entangled photon pair of the individual second entangled photon, generating a plurality of quantum key bits based on the measurement information of entangled photon pairs of photon pulses that are in the populated photon pulse state, and generating a quantum cryptography key having the plurality of quantum key bits.

Although the concepts of the present disclosure are described herein with primary reference to quantum key generation, it is contemplated that the concepts will enjoy applicability to any quantum information communication.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
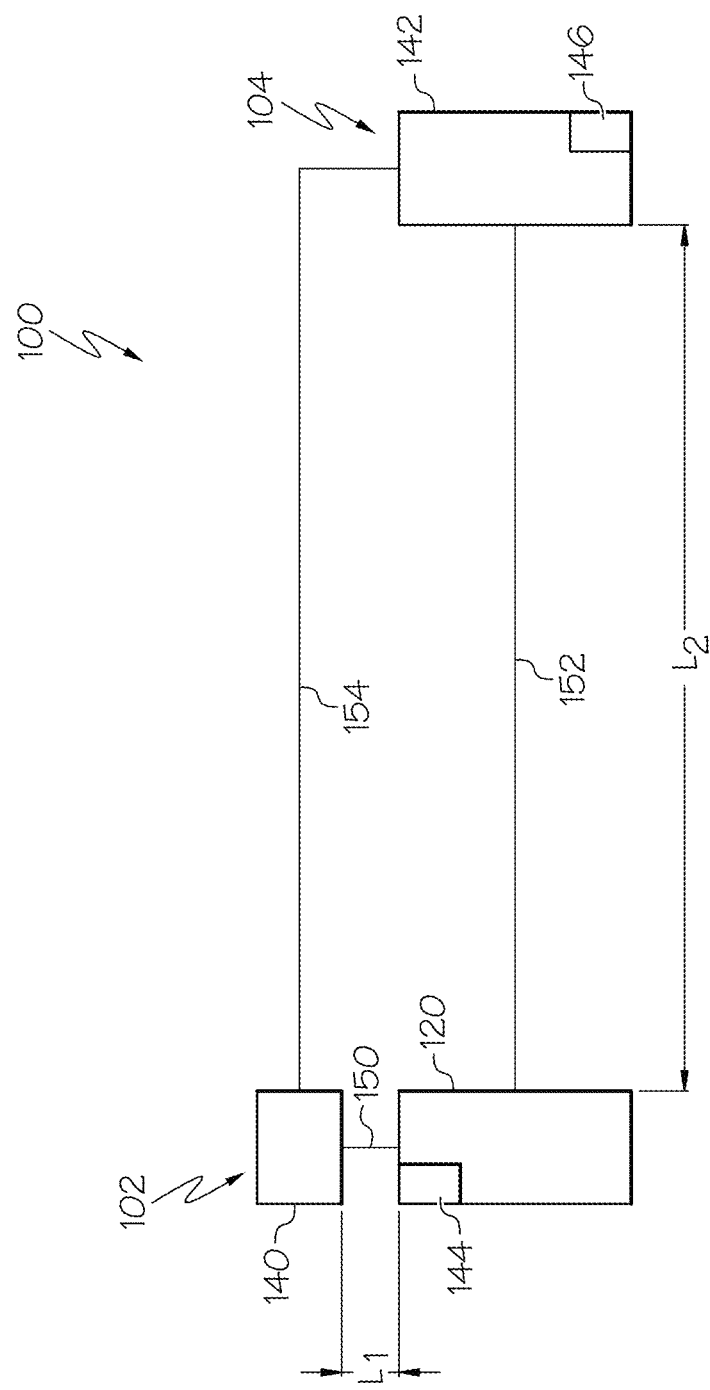
FIG. 1 schematically depicts a quantum communications system an entangled photon generator, an output end photon detector unit, and a receiving end photon detector unit, according to one or more embodiments shown and described herein.

Referring now to FIG. 1, a quantum communications system 100 comprising an entangled photon generator 120, an output end photon detector unit 140, and a receiving end photon detector unit 142 is schematically depicted. The entangled photon generator 120 and the output end photon detector unit 140 are each positioned at an output end 102 (often referred to as "Alice") of the quantum communications system 100 and the receiving end photon detector unit 142 is positioned at a receiving end 104 (often referred to as "Bob") of the quantum communications system 100. The quantum communications system 100 is structurally configured to communicate quantum information between separate locations (e.g., the output end 102 and the receiving end 104) for example, by generating particles (e.g., photons) comprising entangled quantum states and transmitting the entangled quantum states to and between separate locations along one or more photon pathways 150, 152. Further, this quantum information may comprise a cryptographic key (e.g., a cryptographic quantum key) that may be used to encode and/or decode encrypted information sent between the output end 102 and the receiving end 104 along a signal pathway 154 (often referred to as a "classical channel"). Further, the signal pathway 154 may also be used to communicate unsecured information between the output end 102 and the receiving end 104.

As depicted in FIG. 1, a first photon pathway 150 extends between and optically couples the entangled photon generator 120 and the output end photon detector unit 140 and a second photon pathway 152 extends between and optically couples the entangled photon generator 120 and the receiving end photon detector unit 142. The first photon pathway 150 and/or the second photon pathway 152 may comprise an optical waveguide, such as an optical fiber comprising a core and a cladding surrounding the core, a planar waveguide, or the like. Alternatively, the first photon pathway 150 and the second photon pathway 152 may comprise a free space pathway, which may be located in a vacuum or in an atmosphere. When the first photon pathway 150 comprises a free space pathway, no intervening optical components are positioned between the entangled photon generator 120 and the output end photon detector unit 140 along the first photon pathway 150. Further, when the second photon pathway 152 comprises a free space pathway, no intervening optical components are positioned between the entangled photon generator 120 and the receiving end photon detector unit 142 along the second photon pathway 152. Further, in some embodiments, the first photon pathway 150 and/or the second photon pathway 152 may include one or more optical components such as lenses (e.g., focusing lenses, collimating lenses, etc.), mirrors, or the like, used in combination with one or more waveguides or used without any waveguides such that portions of the first photon pathway 150 and/or the second photon pathway 152 are located in a vacuum or in an atmosphere.

The output end photon detector unit 140 and/or the receiving end photon detector unit 142 may comprise a photon detector, such as a single photon detector, for example, a superconducting nanowire single-photon detector, a carbon nanowire detector, a low noise photodiode, or the like. In other embodiments, the output end photon detector unit 140 and/or the receiving end photon detector unit 142 may comprise a photon number resolving detector. However, it should be understood that the output end photon detector unit 140 and the receiving end photon detector unit 142 may comprise any photon detector. Further, the output end 102 may include an output end controller 144 and the receiving end 104 may comprise a receiving end controller 146. For example, the output end controller 144 may be positioned in the output end photon detector unit 140, the entangled photon generator 120, or may be a standalone component. As an illustrative example, FIG. 1 depicts the output end controller 144 in the entangled photon generator 120, however, it should be understood that the output end controller 144 may alternatively be positioned in the output end photon detector unit 140 or may be a standalone component. Further, the receiving end controller 146 may be positioned in the receiving end photon detector unit 142 (as depicted in FIG. 1) or may be a standalone component. Moreover, some embodiments of the quantum communications system 100 may not include one or both of the output end controller 144 and the receiving end controller 146.

The output end controller 144 may comprise a processor and control logic for controlling the output end photon detector unit 140 and the receiving end controller 146 may comprise a processor and control logic for controlling the receiving end photon detector unit 142. In operation, the output end controller 144 may apply a randomly selected quantum basis to the measurement of the first entangled photon by the output end photon detector unit 140 and the receiving end controller 146 may apply a randomly selected quantum basis to the measurement of the second entangled photon by the receiving end photon detector unit 142.

Further, the output end controller 144 and the receiving end controller 146 may provide clock timing, synchronization, and calibration to the output end photon detector unit 140 and the receiving end photon detector unit 142, respectively.

Referring still to FIG. 1, the signal pathway 154 communicatively couples the output end photon detector unit 140 and the receiving end photon detector unit 142, for example, communicatively coupling the output end controller 144 and the receiving end controller 146, as depicted in FIG. 1. For example, the output end controller 144 and the receiving end controller 146 may include transceivers or other communication devices configured to send and receive communication over the signal pathway 154. The signal pathway 154 may be formed from any medium that is capable of transmitting a signal such as, for example, conductive wires, conductive traces, optical waveguides, or the like. In some embodiments, the signal pathway 154 may facilitate the transmission of wireless signals, such as WiFi, Bluetooth, free space, or the like. Moreover, the signal pathway 154 may be formed from a combination of mediums capable of transmitting signals. While not intending to be limited by theory, the signal pathway 154 comprises a "classical" communication channel that allows the output end photon detector unit 140 (e.g., Alice) to communicate with the receiving end photon detector unit 142 (e.g., Bob).

Further, in some embodiments, the signal pathway 154 and the second photon pathway 152 may be disposed within a single fiber, for example, a multicore optical fiber in which one core serves as the second photon pathway 152 and another core serves as the signal pathway 154 or alternatively a fiber having at least one optical pathway (e.g., a core) operating as the second photon pathway 152 and at least one electrical pathway operating as the signal pathway 154. In embodiments in which the signal pathway 154 and the second photon pathway 152 are disposed within a single fiber, the entangled photon generator 120 and the output end photon detector unit 140 may be housed together. Further, the signal pathway 154 may be shorter than the second photon pathway 152 (e.g., the second photon pathway 152 may take a more circuitous route to the receiving end photon detector unit 142 than the signal pathway 154), the signal pathway 154 may be longer than the second photon pathway 152, or the signal pathway 154 may comprise the same length as the second photon pathway 152 (e.g., when the signal pathway 154 and the second photon pathway 152 are disposed within a single optical fiber or comprise fibers within a single bundle of fibers).

Referring still to FIG. 1, the entangled photon generator 120 is structurally configured to generate a photon pulse. The photon pulse comprises a photon pulse state that is either a populated photon pulse state (e.g., a populated photon pulse) or an empty photon pulse state (e.g., an empty photon pulse). When the photon pulse generated by the entangled photon generator 120 is in the populated photon pulse state, the photon pulse comprises an entangled photon pair, for example, a first entangled photon and a second entangled photon. In some embodiments, the first entangled photon may comprise an idler photon and the second entangled photon may comprise a signal photon. As depicted in FIG. 1, the entangled photon generator 120 is optically coupled to the output end photon detector unit 140 and the receiving end photon detector unit 142 using the first photon pathway 150 and the second photon pathway 152, respectively, such that, when the entangled photon generator 120 outputs the pair of entangled photons, the first entangled photon propagates along the first photon pathway 150 and the second entangled photon propagates along the second photon pathway 152.

In some embodiments, the entangled photon generator 120 is structurally configured to generate a photon pulse that may comprise entangled photon pairs using a parametric down conversion process. For example, the entangled photon generator 120 may comprise a laser source optically coupled to one or more non-linear crystals. In other embodiments, the entangled photon generator 120 may be structurally configured to generate an entangled photon pair using a four-wave mixing process, or any method or process of generating a photon pulse that may comprise one or more entangled photon pairs. Further, the entangled photon generator 120 may be structurally configured to generate and output a photon pulse that may comprise one or more entangled photon pairs having any wavelength $\lambda$, for example, from about 800 nm to about 1800 nm, for example about 1550 nm.

Further, when the photon pulse generated by the entangled photon generator 120 is in the empty photon pulse state no photons are generated or output. In other words, the empty photon pulse state means an empty photon pulse was generated. While not intending to be limited by theory, there is a probability that an individual photon pulse generated by the entangled photon generator 120 comprises an empty photon pulse and there is a probability that the individual photon pulse generated by the entangled photon generator 120 comprises a populated photon pulse. As described in more detail below, in the methods described herein the output end photon detector unit 140 communicates information about the photon pulse state (e.g., a photon pulse population state) to the receiving end photon detector unit 142 such that the receiving end photon detector unit 142 may disregard signals (e.g., false positives) received during a photon pulse time slot associated with an empty photon pulse.

In operation, the entangled photon generator 120 is configured to iteratively generate photon pulses and when the photon pulses comprise populated photon pulse states, the entangled photon generator 120 outputs entangled photon pairs, i.e. outputs a first entangled photon and a second entangled photon. The plurality of iteratively generated photon pulses may be used to form the quantum key bits of the quantum cryptography key at each of the output end photon detector unit 140 and the receiving end photon detector unit 142. This allows the communication between the output end 102 and the receiving end 104 over classical communication channels (e.g., the signal pathway 154), to be encrypted using the quantum cryptography key.

Further, each iteratively generated photon pulse (both populated photon pulses and empty photon pulses) are associated with a photon pulse time slot, which provides a chronological frame of reference such that each first entangled photon may be associated with its respective pair (e.g., with the second entangled photon) when the first entangled photon is spatially separated from the second entangled photon, for example, when the first entangled photon is measured at the output end photon detector unit 140 and the second entangled photon is measured at the receiving end photon detector unit 142. Thus, the output end photon detector unit 140 may determine that the photon pulse is an empty photon pulse by attempting to detect a photon at the time at which the first entangled photon would be at the output end photon detector unit 140 (e.g., when the photon pulse time slot is temporally positioned at the output end photon detector unit 140). If output end photon detector unit 140 does not detect a photon during the photon pulse time slot, the output end photon detector unit 140 may determine that the photon pulse is an empty photon pulse. Further, the output end photon detector unit 140 may output a signal to the input end photon detector unit (e.g., along the signal pathway 154) to inform the receiving end photon detector unit 142 that a particular photon pulse time slot comprises an empty photon pulse, allowing the receiving end photon detector unit 142 to disregard any signals received during that photon pulse time slot. In particular, this allows the receiving end photon detector unit 142 to disregard the photon pulse time slot associated with this empty photon pulse even when noise sources, such encoding apparatus imperfections, detector dark count, afterpulsing, and Raman noise may cause the receiving end photon detector unit 142 to receive a "false positive" signal (e.g., noise data) in the photon pulse time slot associated with the empty photon pulse.

Without the signal from the output end photon detector unit 140, the receiving end photon detector unit 142 may erroneously assign a quantum key bit value to a photon pulse time slot associated with an empty photon pulse. However, the methods described herein may limit the number of false positives by providing the receiving end photon detector unit 142 with information regarding the photon pulse state of a plurality of photon pulses and, in some embodiments, excluding measurement information received in photon pulse time slots associated with photon pairs comprising an empty photon pulse state from use in the generation of the quantum cryptography key.

Further, the first photon pathway 150 comprises a first propagation length $L_1$ and the second photon pathway 152 comprises a second propagation length $L_2$. The first propagation length $L_1$ may be shorter than the second propagation length $L_2$ such that, after the entangled photon generator 120 generates a photon pulse temporally positioned within a photon pulse time slot the output end photon detector unit 140 may measure whether the photon pulse is a populated photon pulse or an empty photon pulse before the photon pulse time slot reaches the receiving end photon detector unit 142. In other words, because the first propagation length $L_1$ is shorter than the second propagation length $L_2$, when the photon pulse comprises a populated photon pulse (and the entangled photon generator 120 outputs a first entangled photon and a second entangled photon), the first entangled photon reaches the output end photon detector unit 140 before the second entangled photon reaches the receiving end photon detector unit 142. However, in other embodiments, the first propagation length $L_1$ may be longer than or equal to the second propagation length $L_2$ and the measurement of the photon pulse state of the photon pulse may occur as or after the second entangled photon reaches the receiving end photon detector unit 142.

Figure 2:
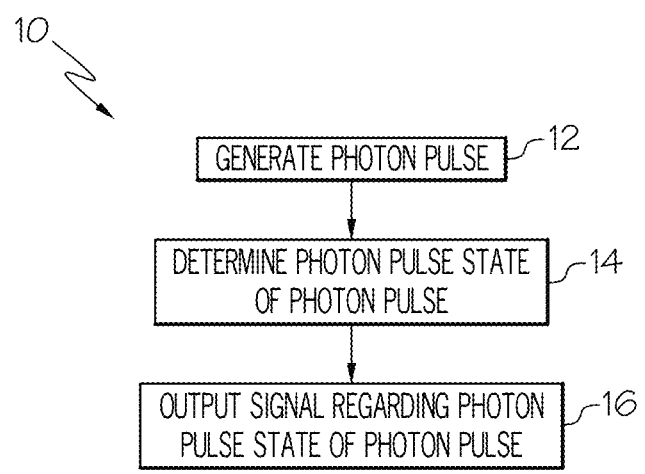
FIG. 2 schematically depicts a flowchart of a method of determining a photon pulse state of an photon pulse, according to one or more embodiments shown and described herein.

Referring now to FIG. 2, a method schematically depicted by flowchart 10 may be used to determine a photon pulse state of a photon pulse and communicate information regarding the photon pulse state. The flow chart depicts a number of method steps, which, while described in a particular sequential order are not limited to that sequential order. First, at step 12, a photon pulse temporally positioned within a photon pulse time slot is generated using the entangled photon generator 120. As described above, when the photon pulse comprises an empty photon pulse, no photons (e.g., no entangled photon pairs) are generated and output by the entangled photon generator 120 and when the photon pulse comprises a populated photon pulse, a first entangled photon of an entangled photon pair is output from the entangled photon generator 120 into the first photon pathway 150 and a second entangled photon of the entangled photon pair is output from the entangled photon generator 120 into the second photon pathway 152.

Next, at step 14, when the photon pulse time slot is temporally positioned at the output end photon detector unit 140, the output end photon detector unit 140 may determine the photon pulse state of the photon pulse (e.g., determine whether each photon pulse is a populated photon pulse or an empty photon pulse) by detecting whether a photon (e.g., the first entangled photon) is received by the output end photon detector unit 140. When the output end photon detector unit 140 detects a photon during the photon pulse time slot (e.g., when the photon pulse time slot is temporally positioned at the output end photon detector unit 140), the output end photon detector unit 140 may determine that the photon pulse is a populated photon pulse and when the output end photon detector unit 140 does not detect a photon during the photon pulse time slot, the output end photon detector unit 140 may determine that the photon pulse is an empty photon pulse.

Further, in embodiments in which the first photon pathway 150 is shorter than the second photon pathway 152, the output end photon detector unit 140 may determine whether the photon pulse is a populated photon pulse or an empty photon pulse before the photon pulse time slot is temporally positioned at the receiving end photon detector unit 142. Thus, the output end photon detector unit 140 may determine if the photon pulse is a populated photon pulse or an empty photon pulse before the receiving end photon detector unit 142 performs a measurement of the photon pulse (e.g., by attempting to detect and measure the second entangled photon). However, in embodiments in which first photon pathway 150 is longer than or equal to than the second photon pathway 152, the output end photon detector unit 140 may determine if the photon pulse is a populated photon pulse or an empty photon pulse after or as the receiving end photon detector unit 142 performs a measurement of the photon pulse and may provide information regarding the photon pulse state of the measured photon pulse after the receiving end photon detector unit 142 measures the photon pulse (e.g., by attempting to detect and measure the second entangled photon).

Referring still to FIG. 2, at step 16, the output end photon detector unit 140 outputs a signal regarding the photon pulse state of the photon pulse into a signal pathway 154 such that the signal provides the receiving end photon detector unit 142 with information regarding the photon pulse state. Thus, the receiving end photon detector unit 142 can disregard empty photon pulses (and measurement information received in the associated photon pulse time slot of the empty photon pulse, such as noise signals) from use in formation of a quantum cryptographic key, as described in more detail with respect to the method of FIG. 4, below.

Figure 3:
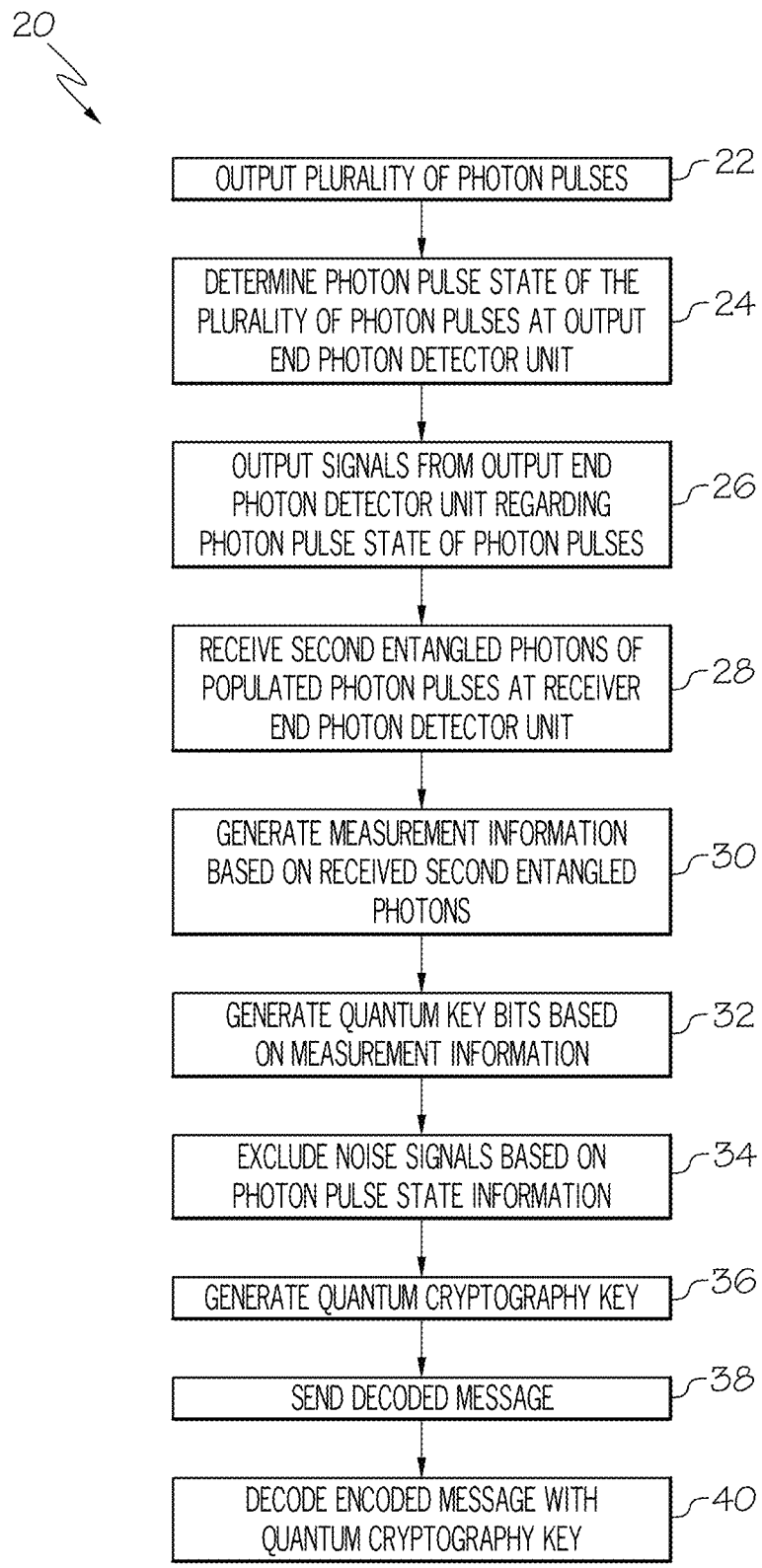
FIG. 3 schematically depicts a flowchart of a method of generating a quantum cryptography key, according to one or more embodiments shown and described herein.

Referring now to FIG. 3, a method schematically depicted by flowchart 20 may be used to generate a quantum cryptography key. The flow chart depicts a number of method steps which, while described in a particular sequential order, are not limited to that sequential order. First, at step 22, a plurality of photon pulses may be generated by the entangled photon generator 120, each photon pulse comprising an empty photon pulse or a populated photon pulse. When a photon pulse comprises a populated photon pulse, the entangled photon generator 120 outputs an entangled photon pair comprising a first entangled photon output into the first photon pathway 150 and a second entangled photon output into the second photon pathway 152. Further, the entangled photon generator 120 does not output photons when the photon pulse comprises an empty photon pulse. Moreover, each photon pulse (both populated photon pulses and empty photon pulses) is temporally positioned within a photon pulse time slot. Next, at step 24, when each photon pulse time slot of the plurality of photon pulses generated by the entangled photon generator 120 is temporally positioned at the output end photon detector unit 140, the output end photon detector unit 140 may determine whether each the photon pulse is a populated photon pulse or an empty photon pulse by detecting whether a photon (e.g., the first entangled photon) is received by the output end photon detector unit 140.

Further, at step 26, the output end photon detector unit 140 may output a plurality of signals regarding the photon pulse state of each photon pulse into the signal pathway 154, thus providing the receiving end photon detector unit 142 with information regarding the photon pulse state of each photon pulse. Next, at step 28, the receiving end photon detector unit 142 may iteratively receive second entangled photons of the plurality of entangled photon pairs of the photon pulses that comprise populated photon pulses. At step 30, the receiving end photon detector unit 142 may generate measurement information (e.g., a signal, value, or the like) based on each second entangled photon, such as information regarding the presence of each second entangled photon, a quantum state of each second entangled photon (and thereby each entangled photon pair), or at least one correlated entangled particle property of each second entangled photon (e.g., a linear polarization, a circular polarization, a spin, a translational momentum, an orbital angular momentum, a photon pulse state, or the like).

At step 32, the measurement information may be used to generate a plurality of quantum key bits, for example, using the receiving end photon detector unit 142 or another computing device communicatively coupled to the receiving end photon detector unit 142. Each quantum key bit is generated based on measurement information received from photon pulses comprising a populated photon pulse state. In particular, at step 34, the method comprises excluding measurement information generated based on a signal received by the receiving end photon detector unit 142 during a photon pulse time slot associated with an empty photon pulse from use when generating the plurality of quantum key bits. Because the output end photon detector unit 140 outputs a plurality signals regarding the photon pulse state of the plurality of photon pulses and their respective photon pulse time slots into the signal pathway 154, the receiving end photon detector unit 142 may exclude any measurement information received during photon pulse time slots of empty photon pulses from use as a basis for an individual quantum key bit, such that noise signals that enter time slots of empty photon pulses may be disregarded.

Further, at step 36, the method comprises generating a quantum cryptography key that comprises the plurality of quantum key bits for example, using the receiving end photon detector unit 142 or another computing device communicatively coupled to the receiving end photon detector unit 142. Next, at step 38, once the quantum cryptography key is formed, the output end photon detector unit 140 may send an encoded message to the receiving end photon detector unit 142 along the signal pathway 154 or along another additional encrypted classical signal pathway. Upon receipt of the encoded message, at step 40, the receiving end photon detector unit 142 may decode the encoded message using the quantum cryptography key.

While not intending to be limited by theory, by using the methods described above to form a quantum cryptography key, errors due to false detections based on noise measured in a photon pulse time slot associated with an empty photon pulse may be reduced or eliminated, thereby reducing a quantum key bit error ratio of the quantum communications system 100. As used herein, "quantum key bit error ratio" refers to a ratio of the number of photon pulse time slots that the receiving end photon detector unit 142 performs a measurement in error to the total number of photon pulse time slots that a measurement occurs at the receiving end photon detector unit 142. Reducing the quantum key bit error ratio of the quantum communications system 100 can increase a secure key rate of the quantum communications system 100.

In operation, the quantum communications system 100 comprises a false detection probability $p_{false}$, which is the probability that an individual quantum key bit will be generated in error, for example, because of mismatched quantum bases during measurement at the output end photon detector unit 140 and the receiving end photon detector unit 142 (e.g., the output end controller 144 may randomly choose a quantum basis for the output end photon detector unit 140 or the entangled photon generator 120 to measure the first entangled photon and the receiving end controller 146 may randomly choose a quantum basis for the receiving end photon detector unit 142 to measure the second entangled photon and if these are mismatched an error may occur), false detections based on noise measured in a photon pulse time slot associated with an empty photon pulse, which, as described above, may be caused by encoding apparatus imperfections, stray photons, detector dark count, afterpulsing, and Raman noise. However, excluding measurement information received by the receiving end photon detector unit 142 during photon pulse time slots associated with empty photon pulses may decrease the false detection probability $p_{false}$, such that the quantum communications system 100 may comprise an improved (e.g., lowered) false detection probability $p_{false,improved}$, where $p_{false,improved} = (1-p_0)p_{false}$ and $p_0$ an empty pulse probability of an entangled photon pair.

Further, while not intending to be limited by theory, a plurality of photon pulses generated by the entangled photon generator 120 comprise an average number photons per pulse $\mu$. The average number of photons per pulse $\mu$ affects the empty pulse probability $p_0$ such that $p_{0(\mu)} = e^{-\mu}$. For example, while not intending to be limited by theory, conventional values of the average number photons per pulse $\mu$ for different quantum key generation protocols include 0.1 for the BB84 protocol, 0.2 for the SARG protocol, and 0.5 for the COW protocol. Using these values, the corresponding empty pulse probabilities $p_0$ are 0.9048 for the BB84 protocol, 0.819 for the SARG protocol and 0.6065 for the COW protocol. Thus, the equation $p_{false,improved} = (1-p_0)p_{false}$ shows that the improved false detection probability $p_{false,improved}$ may be about 2 to about 10 times lower than the false detection probability $p_{false}$ of previous methods. For example, when $\mu=0.1$ (e.g., in the BB84 protocol) the improved false detection probability $p_{false,improved}$ may be about 10 times lower than the false detection probability $p_{false}$ of previous methods and when $\mu=0.5$ (e.g., in the COW protocol) the improved false detection probability $p_{false,improved}$ may be about 2.5 times lower than the false detection probability $p_{false}$ of previous methods.

Figure 4:
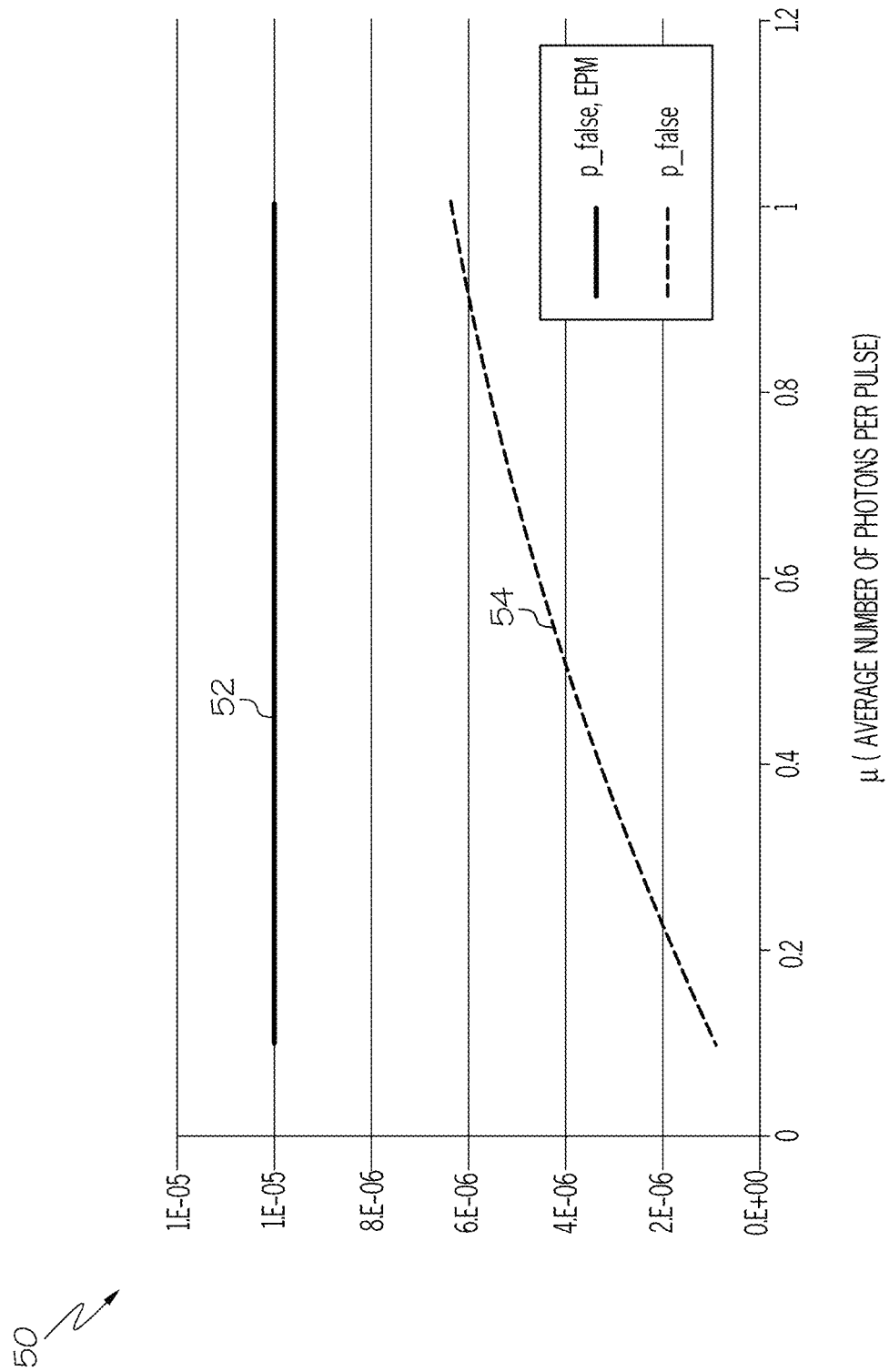
FIG. 4 graphically depicts a the reduction in false detection probability as a function of the average number photons per pulse, according to one or more embodiments shown and described herein.

Referring now to FIG. 4, a graph 50 illustrates the reduction in false detection probability as a function of the average number photons per pulse $\mu$, using the methods described herein. In particular, line 52 depicts the false detection probability $p_{false}$, which includes false detections based on mismatched quantum basis during measurement and false detections based on noise measured in a photon pulse time slot associated with an empty photon pulse and line 54 depicts the improved false detection probability $p_{false,improved}$ with reduced and/or eliminated false detections based on noise measured in a photon pulse time slot associated with an empty photon pulse.

Figure 5:
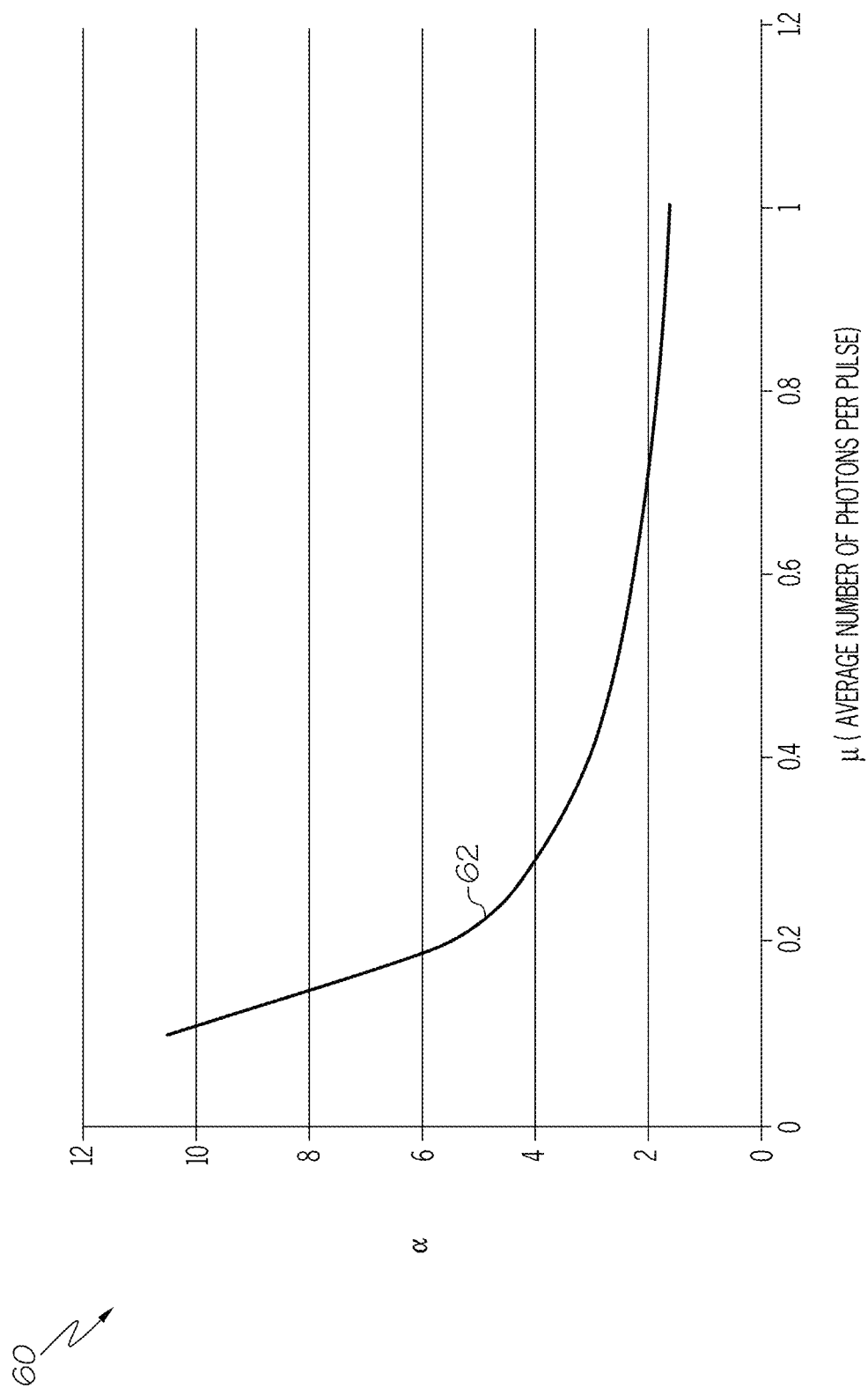
FIG. 5 graphically depicts an advantage factor of the methods described herein as a function of the average number photons per pulse, according to one or more embodiments shown and described herein.

Referring now to FIG. 5, a graph 60 graphically illustrates the advantage of the methods of mitigating false photon detections described herein. In particular, the advantage may mathematically described by the dimensionless factor $\alpha$, where $\alpha(\mu) = p_{false}/p_{false,EPM} = (1-p_0(\mu))^{-1}$. As shown by line 62 in graph 60, the advantage of the method of mitigating false photon detections described herein increases as the average number photons per pulse $\mu$ decreases.

Figure 6:
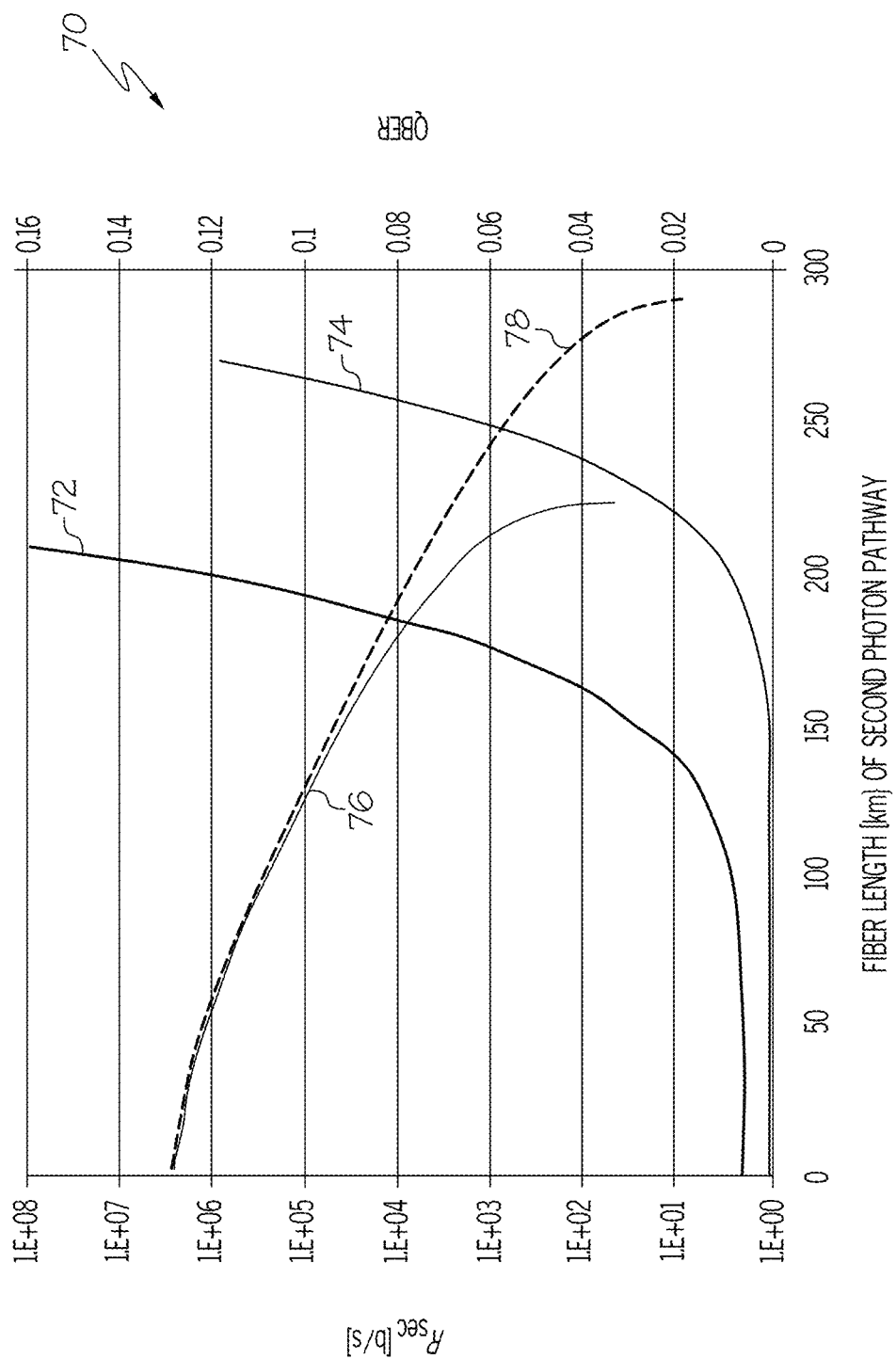
FIG. 6 graphically depicts the quantum key bit error ratio and the secure bit rate of the quantum communications system, using an example quantum key generation protocol, according to one or more embodiments shown and described herein.

Referring now to FIG. 6, a graph 70 graphically illustrates the reduction of both the quantum key bit error ratio ("QBER") and the increase in the secure bit rate ("$R_{SEC}$," depicted in bits per second [b/s]) when using the methods of mitigating false photon detections described herein using the quantum communications system 100 and a COW protocol. In this embodiment, the second photon pathway 152 and the signal pathway 154 are disposed within different fibers. Line 72 of graph 70 depicts the QBER of the quantum communications system 100 as a function of the fiber length of the second photon pathway 152 (e.g., the second propagation length $L_2$) when the methods of mitigating false photon detections described herein are not used and line 74 depicts the QBER as a function of the fiber length of the second photon pathway 152 when the methods of mitigating false photon detections described herein are used. As depicted in FIG. 6, using the methods of mitigating false photon detections described herein reduces QBER, particularly when the length of the second photon pathway 152 increases. Further, line 76 depicts the $R_{SEC}$ of the quantum communications system 100 as a function of the fiber length of the second photon pathway 152 when the methods of mitigating false photon detections described herein are not used and line 78 depicts the $R_{SEC}$ as a function of the fiber length of the second photon pathway 152 when the methods of mitigating false photon detections described herein are used. As depicted in FIG. 6, using the methods of mitigating false photon detections described herein increases $R_{SEC}$, particularly when the length of the second photon pathway 152 increases.

Figure 7:
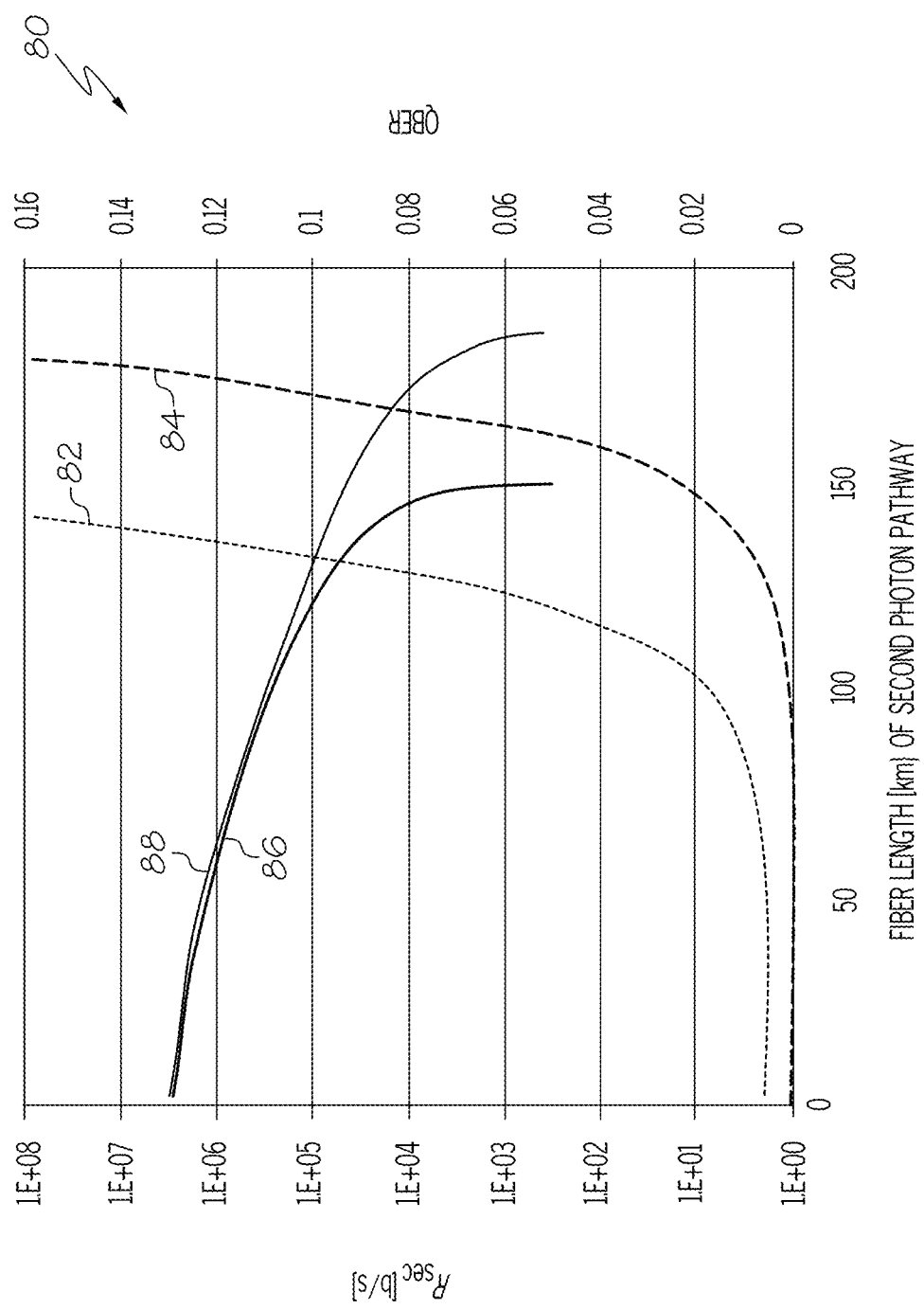
FIG. 7 graphically depicts the quantum key bit error ratio and the secure bit rate of the quantum communications system, using another example quantum key generation protocol, according to one or more embodiments shown and described herein.

Referring now to FIG. 7, a graph 80 graphically illustrates the reduction of both QBER and the increase in $R_{SEC}$ (depicted in bits per second [b/s]) when using the methods of mitigating false photon detections described herein using the quantum communications system 100 and a COW protocol. In this embodiment, the second photon pathway 152 and the signal pathway 154 are disposed the same fiber. Line 82 of graph 80 depicts the QBER of the quantum communications system 100 as a function of the fiber length of the second photon pathway 152 (e.g., the second propagation length $L_2$) when the methods of mitigating false photon detections described herein are not used and line 84 depicts the QBER as a function of the fiber length of the second photon pathway 152 when the methods of mitigating false photon detections described herein are used. As depicted in FIG. 7, using the methods of mitigating false photon detections described herein reduces QBER, particularly when the length of the second photon pathway 152 increases. Further, line 86 depicts the $R_{SEC}$ of the quantum communications system 100 as a function of the fiber length of the second photon pathway 152 when the methods of mitigating false photon detections described herein are not used and line 88 depicts the $R_{SEC}$ as a function of the fiber length of the second photon pathway 152 when the methods of mitigating false photon detections described herein are used. As depicted in FIG. 7, using the methods of mitigating false photon detections described herein increases $R_{SEC}$, particularly when the length of the second photon pathway 152 increases.

While not intending to be limited by theory, the performance of the quantum communications system 100 may be characterized by a "system reach," which is the length of the second photon pathway 152 at which either the $R_{SEC}$ or QBER reach a threshold value at which the capabilities of the receiving end photon detector unit 142 are diminished below an acceptable level (e.g., a length at which the receiving end photon detector unit 142 performs an unacceptable number of false measurements). As depicted in FIGS. 6 and 7, the methods of mitigating false photon detections described herein increases the system reach of the quantum communications system 100. Moreover, note that in the examples depicted in FIGS. 6 and 7, an ideal detector at Alice (e.g., an ideal output end photon detector unit 130 that detects the photon pulse state of each photon pulse with 100% efficiency) is assumed, however, it should be understood that the relative improvements in QBER and $R_{SEC}$ will occur in quantum communications systems 100 without ideal detectors.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of generating a quantum cryptography key, the method comprising:
   generating a plurality of photon pulses using an entangled photon generator, wherein:
      the plurality of photon pulses each comprise a photon pulse state that is either a populated photon pulse state or an empty photon pulse state;
      each photon pulse of the plurality of photon pulses is temporally positioned within a photon pulse time slot;
      the entangled photon generator comprises a laser source and a non-linear crystal that is optically coupled to the laser source;
      when an individual photon pulse generated by the entangled photon generator is in the populated photon pulse state:
         the photon pulse comprises a first entangled photon entangled with a second entangled photon each output by the entangled photon generator using a parametric down conversion process;
         the entangled photon generator outputs the first entangled photon into a first photon pathway, which comprises an optical fiber and optically couples to the entangled photon generator and an output end photon detector unit that comprises a single photon detector unit; and
         the entangled photon generator outputs the second entangled photon into a second photon pathway, which comprises an optical fiber and optically couples to the entangled photon generator and a receiving end photon detector unit;
   determining the photon pulse state of each photon pulse of the plurality of photon pulses using the output end photon detector unit;
   outputting, from the output end photon detector unit, a plurality of signals regarding the photon pulse states of the plurality of pulses into a signal pathway communicatively coupled to the receiving end photon detector unit, such that each signal of the plurality of signals provides the receiving end photon detector unit with information regarding the photon pulse state of each of the plurality of photon pulses;
   generating, upon each receipt of an individual second entangled photon by the receiving end photon detector unit, measurement information regarding an entangled photon pair of the individual second entangled photon;
   generating a plurality of quantum key bits based on the measurement information of entangled photon pairs of photon pulses that are in the populated photon pulse state; and
   generating a quantum cryptography key comprising the plurality of quantum key bits.

2. The method of claim 1, further comprising excluding measurement information generated based on a signal received by the receiving end photon detector unit during an individual photon pulse time slot associated with a photon pulse that comprises an empty photon pulse state from use when generating the plurality of quantum key bits.

3. The method of claim 1, wherein the output end photon detector unit comprises a photon detector.

4. The method of claim 3, wherein the photon detector of the output end photon detector unit comprises a single-photon detector.

5. The method of claim 1, wherein the output end photon detector unit comprises a photon number resolving detector.

6. The method of claim 1, wherein the second photon pathway and the signal pathway are each disposed within a single optical fiber.

7. The method of claim 1, wherein the output end photon detector unit determines the photon pulse state of each photon pulse of the plurality of photon pulses by detecting whether the first entangled photon of an individual photon pulse is received by the output end photon detector unit when the photon pulse time slot of the individual photon pulse is temporally located at the output end photon detector unit.

8. The method of claim 1, further comprising sending an encoded message from the output end photon detector unit to the receiving end photon detector unit along the signal pathway.

9. The method of claim 8, further comprising decoding the encoded message using the quantum cryptography key, upon receipt of the encoded message at the receiving end photon detector unit.

10. The method of claim 1, wherein the first photon pathway and the second photon pathway each comprise an optical waveguide.

* * * * *